United States Patent Office 3,362,981
Patented Jan. 9, 1968

3,362,981
α-IMINOPERFLUORONITRILES
William J. Middleton, Chatham, Wilmington, Del., assignor to E. I. du Pont de Nemours and Company, Wilmington, Del., a corporation of Delaware
No Drawing. Filed Dec. 9, 1965, Ser. No. 512,796
7 Claims. (Cl. 260—464)

This invention relates to α-iminoperfluoronitriles and their preparation.

The novel compounds of this invention are represented by the structural formula

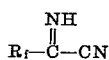

where $R_f$ is perfluoroalkyl of 1 through 10 carbon atoms, perfluorocyclohexyl or perfluoro (cyclohexylmethyl). These compounds are prepared by the process of this invention which comprises reacting a perfluoronitrile of the formula $R_f$—C≡N, where $R_f$ is as defined above, with hydrogen cyanide in the presence of a base, which acts as a catalyst for the addition reaction. The novel products are, in general, volatile, colorless liquids which exist in two isomeric forms, syn and anti. Both isomeric forms comprise the products of this invention.

The process can be carried out at temperatures ranging from about −10° to about 150° C., the preferred range being 20° to 70° C. For convenience, the reaction is preferably conducted in a closed vessel under autogenous pressure; however, pressure is not critical and the reaction can be conducted at subatmospheric or superatmospheric pressures. The molar ratio of the nitrile and the hydrogen cyanide is not critical, but an approximately equimolar ratio is preferred.

Preferred basic catalysts are the secondary and tertiary aliphatic and heterocyclic amines, such as the di- and tri- lower alkyl amines, as for example, diethylamine, triethylamine, dibutylamine, tripropylamine, dihexylamine, and the lower heterocyclic amines, in which any other hetero atom present is oxygen, of 5–6 annular atoms and a total of 4–8 carbon atoms, as for example, morpholine, N-methylmorpholine, piperidine, N-ethylpiperidine, pyridine, α-picoline, pyrrolidine, N-butylpyrrolidine, and the like. The amount of catalyst employed can range from 0.1 to 10 molar percent based on the perfluoroalkylnitrile reactant. Preferably the amount will be between 1 to 5 molar percent.

The perfluoroalkylnitriles used as a starting material are either available commercially or can be prepared by the dehydration of the corresponding amides with phosphoric anhydride at 150° to 200° C., as described by H. Gilman et al., J. Am. Chem. Soc., 65, 1458 (1943). Because of availability, $R_f$ in the compounds of this invention is preferably perfluoroalkyl of 1 through 10 carbon atoms.

The following Examples serve to illustrate, but do not limit, the invention:

EXAMPLE I

*α-Iminotrifluoropropiononitrile*

A mixture of 40 ml. (about 1 mole) of liquid hydrogen cyanide, 95 g. (1 mole) of trifluoroacetonitrile, and 2 ml. of morpholine was heated in a 240 ml. corrosion-resistant bomb at 50° for 8 hours. The bomb was cooled and vented, and the contents were distilled to give 64.9 g. (53%) of α-iminotrifluoropropiononitrile as a colorless liquid, B.P. 71.5–72°, $n_D{}^{25}$ 1.3301, α-Iminotrifluoropropiononitrile was also prepared in somewhat lower yield, by a similar reaction using triethylamine as a catalyst in place of the morpholine.

The infrared spectrum of α-iminotrifluoropropiononitrile shows a band at 3.07μ for NH, 4.46μ for C≡N and at 6.08μ for C=N. The H¹ N.M.R. spectrum shows two broad signals at τ −2.92 (relative area 2) and τ −2.46 (relative area 1) indicating both syn and anti-isomers. The F¹⁹ N.M.R. spectrum shows a doublet ($J_{FH}=2.0$ c.p.s.) at +73.07 p.p.m (relative area 2) and a doublet ($J_{FH}=1.1$ c.p.s.) at +74.61 p.p.m. (relative area 1) from trichlorofluoromethane (F11) used as an internal reference.

*Analysis.*—Calcd. for $C_3HF_3N_2$: C, 29.52; H, 0.83; F, 46.70; N, 22.96. Found: C, 29.89; H, 1.19; F, 47.32; N, 22.93.

EXAMPLE II

*α-Iminopentafluorobutyronitrile*

A mixture of 29.0 g. (0.2 mole) of pentafluoropropiononitrile, 10 ml. (about 0.2 mole) of liquid hydrogen cyanide, and 0.5 ml. of morpholine was heated in a 145 ml. bomb at 50° for 8 hours. The bomb was cooled and vented, and the contents were distilled to give 18.3 g. (53%) of α-iminopentafluorobutyronitrile as a colorless liquid, B.P. 83–83.5°, $n_D{}^{25}$ 1.3180. The infrared spectrum showed bands at 3.07μ for NH, 4.46μ for C≡N, and 6.08μ for C=N. The H¹ N.M.R. spectrum showed broad singlets at τ=3.08 and τ=2.74 in a ratio of about 2:1 indicating the presence of two isomers. The F¹⁹ N.M.R. spectrum also showed the presence of two isomers. The major isomer had absorptions at 82.41 and 118.6 p.p.m. for CF₃ and CF₂ respectively. The minor isomer had absorptions at 82.71 and 121.5 p.p.m. for CF₃ and CF₂ respectively from F11.

*Analysis.*—Calcd. for $C_4HF_5N_2$: C, 27.92; H, 0.59; F, 55.21; N, 16.28. Found: C, 28.13; H, 1.01; F, 55.09; N, 16.25.

EXAMPLE III

*α-Iminoheptafluorovaleronitrile*

A mixture of 39 g. (0.2 mole) of heptafluorobutyronitrile, 10 ml. (about 0.2 mole) of liquid hydrogen cyanide, and 0.5 ml. of morpholine was heated in a 145 ml. bomb at 50° for 8 hours. The bomb was cooled and vented, and the contents were distilled to give 15.8 g. (36%) of α-iminoheptafluorovaleronitrile as a colorless liquid, B.P. 101–101.5°, $n_D{}^{25}$ 1.3152. The infrared spectrum showed bands at 3.07μ for NH, 4.46μ for C≡N, and 6.07μ for C=N. The H¹ N.M.R. spectrum showed two broad signals at τ=3.16 and τ=2.74 (relative area 2:1). The F¹⁹ N.M.R. spectrum showed the presence of two isomers in approximately 2:1 ratio. The major isomer had a triplet (J=9.5 c.p.s.) at 80.66 p.p.m. for CF₃, a singlet at 125.8 p.p.m. for one CF₂, and a quartet (J=9.5 c.p.s.) at 120.7 p.p.m. for the other CF₂. The minor isomer had a triplet (J=9.5 c.p.s.) at 80.66 p.p.m., a singlet at 125.1 p.p.m., and a broad signal at 122.2 p.p.m. for CF₃ and the two CF₂'s, respectively.

*Analysis.*—Calcd. for $C_5HF_7N$: C, 27.04; H, 0.46; F, 59.89; N, 12.62. Found: C, 27.47; H, 0.83; F, 59.30; N, 12.69.

Using the procedure described in the examples, the following α-iminoperfluoronitriles can be prepared from the corresponding perfluoronitriles:

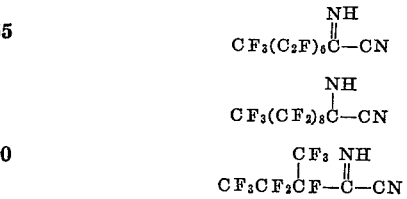

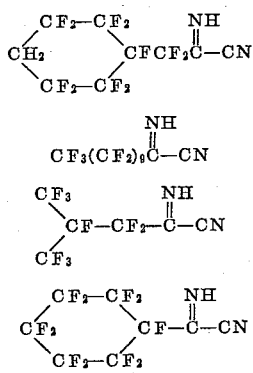

$$CF_3(CF_2)_9\overset{NH}{\overset{\|}{C}}-CN$$

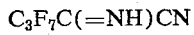

The compounds of this invention are useful as insecticides. Due to their volatility, they are effective as fumigants. For example, approximately 25 adult drosophilae (common fruit flies) were introduced into each of four 250 ml. beakers covered with a filter paper and containing a wad of cotton saturated with a 2% sugar solution (food). Samples of 0.25 ml. of $CF_3C(=NH)CN$, 0.25 ml. of $C_2F_5C(=NH)CN$, and 0.5 ml. of $$C_3F_7C(=NH)CN$$

were injected into three of the beakers respectively through the filter paper by means of a syringe and needle. The fourth beaker was used as a control.

The flies receiving the fumigant treatment were 100% knocked down after 5 minutes and were all dead after 24 hours. There was no mortality in the beaker containing the control flies.

The compounds of the invention are additionally useful as an intermediate, for upon reaction with additional hydrogen cyanide, an imidazolidine is formed.

Since it is obvious that many changes and modifications can be made in the above-described details without departing from the nature and spirit of the invention, it is to be understood that the invention is not to be limited to said details except as set forth in the appended claims.

The embodiments of the invention in which an exclusive property or privilege is claimed are defined as follows:

1. Syn and anti-compound of the formula

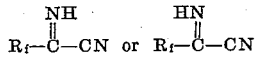

wherein $R_f$ is perfluoroalkyl of 1 through 10 carbon atoms, perfluorocyclohexyl, or perfluoro(cyclohexylmethyl).

2. The compounds of claim 1 wherein $R_f$ is perfluoroalkyl of 1 through 10 carbon atoms.

3. The compound of claim 1 wherein $R_f$ is perfluorocyclohexyl.

4. The compound of claim 1 wherein $R_f$ is perfluoro(cyclohexylmethyl).

5. The compound of claim 1 wherein $R_f$ is perfluoromethyl.

6. The compound of claim 1 wherein $R_f$ is perfluoroethyl.

7. The compound of claim 1 wherein $R_f$ is perfluoropropyl.

References Cited

UNITED STATES PATENTS 2,676,985  4/1954  Husted.
3,215,709  11/1965  Logothetis.

FOREIGN PATENTS 1,053,500  3/1959  Germany.

OTHER REFERENCES

Brown, H. C. and Pater R., Journal of Organic Chemistry, 27 (1962), p. 2858.

Middleton, et al., Journal of Organic Chemistry, 30 (1965), pp. 1398–1399.

JOSEPH P. BRUST, *Primary Examiner.*

S. T. LAWRENCE, *Assistant Examiner.*